(12) United States Patent
Krauer et al.

(10) Patent No.: US 10,030,802 B2
(45) Date of Patent: Jul. 24, 2018

(54) CLOSURE ELEMENT

(71) Applicant: SFC KOENIG AG, Dietikon (CH)

(72) Inventors: Jürg Krauer, Uster (CH); Robert Hollinger, Russikon (CH)

(73) Assignee: SFC KOENIG AG, Dietikon (CH)

( * ) Notice: Subject to any disclaimer, the term of this patent is extended or adjusted under 35 U.S.C. 154(b) by 0 days.

(21) Appl. No.: 15/326,518

(22) PCT Filed: Jul. 18, 2014

(86) PCT No.: PCT/EP2014/065495
§ 371 (c)(1),
(2) Date: Jan. 16, 2017

(87) PCT Pub. No.: WO2016/008539
PCT Pub. Date: Jan. 21, 2016

(65) Prior Publication Data
US 2017/0205017 A1    Jul. 20, 2017

(51) Int. Cl.
*F16L 55/10* (2006.01)
*F16L 55/11* (2006.01)
*F02B 77/00* (2006.01)

(52) U.S. Cl.
CPC ............ *F16L 55/11* (2013.01); *F02B 77/005* (2013.01)

(58) Field of Classification Search
CPC .... F16L 55/11; F16L 55/1133; F16L 55/1141; F02B 77/005; F16B 13/065
USPC ............ 138/89; 220/233–235; 166/192, 193; 29/402.09, 402.16
See application file for complete search history.

(56) References Cited

U.S. PATENT DOCUMENTS

| | | | |
|---|---|---|---|
| 2,754,910 A | | 7/1956 | Derrick et al. |
| 3,200,984 A | * | 8/1965 | Fueslein ............... B65D 59/02 138/89 |
| 3,358,869 A | * | 12/1967 | Palmer ............... F16L 55/1141 138/89 |
| 3,825,146 A | * | 7/1974 | Hirmann ............... B65D 39/12 138/89 |
| 3,952,395 A | * | 4/1976 | Crossman ............... F16L 55/13 138/89 |
| 4,505,334 A | | 3/1985 | Doner et al. |
| 5,078,294 A | * | 1/1992 | Staubli .................. F16B 13/065 220/233 |
| 5,443,097 A | * | 8/1995 | Pfeiffer .................. F16L 55/10 138/89 |

(Continued)

FOREIGN PATENT DOCUMENTS

| | | |
|---|---|---|
| DE | 202008004065 U1 | 6/2008 |
| EP | 0364699 B1 | 4/1990 |

(Continued)

*Primary Examiner* — Patrick F Brinson
(74) *Attorney, Agent, or Firm* — Brian Roffe

(57) ABSTRACT

Closure element for tightly closing a bore, the closure body of which closure element can be pressed into the bore with an oversize. In order to avoid damage to the bore, the closure body is designed as a hollow body. In this way, the closure body can deform slightly as the closure body is pressed into the bore and can thereby reduce the radial pressure on the wall of the borehole. At the same time, the weight of the closure element is reduced. The closure element is preferably a hollow sphere having uniform wall thickness.

20 Claims, 2 Drawing Sheets

(56) References Cited

U.S. PATENT DOCUMENTS

| | | | | |
|---|---|---|---|---|
| 5,485,882 A | * | 1/1996 | Bailey | E21B 33/138 |
| | | | | 166/193 |
| 7,631,664 B1 | * | 12/2009 | Mailand | F16L 55/1108 |
| | | | | 138/89 |
| 7,647,964 B2 | * | 1/2010 | Akbar | E21B 33/138 |
| | | | | 166/193 |
| 8,851,172 B1 | * | 10/2014 | Dudzinski | E21B 33/138 |
| | | | | 166/193 |
| 8,936,168 B2 | | 1/2015 | Wust et al. | |
| 8,950,437 B2 | * | 2/2015 | Ryan | F16L 55/162 |
| | | | | 138/97 |
| 9,366,374 B2 | | 6/2016 | Krauer et al. | |
| 9,383,054 B2 | | 7/2016 | Seiffert et al. | |
| 9,404,330 B2 | * | 8/2016 | Speer | E21B 23/04 |
| 2013/0068461 A1 | | 3/2013 | Maerz et al. | |
| 2015/0000431 A1 | | 1/2015 | Krauer et al. | |

FOREIGN PATENT DOCUMENTS

| | | |
|---|---|---|
| WO | 2008062483 A1 | 5/2008 |
| WO | 2009118215 A1 | 10/2009 |
| WO | 2016008539 A1 | 1/2016 |

\* cited by examiner

CLOSURE ELEMENT

FIELD OF THE INVENTION

The invention relates to a closure element for tightly closing a bore, the closure body of which is provided with a defined outside diameter so that it can be pressed into the bore.

BACKGROUND OF THE INVENTION

Such closure elements are used in engine housings and in hydraulic and pneumatic systems that work with relatively low pressure. In automotive construction these are inserted tightly into bores of engine housings, for example. Closure elements of this type can be produced inexpensively and in addition are easy to fit and remove.

A closure element of this type is disclosed in EP PS 0 364 699 B1. Here the closure element is in the form of a solid sphere that can be pressed into a plug recessed into the bore. The solid sphere works here as an expansion element for the plug. However, it can also be pressed directly into the bore that is to be closed. In both cases the diameter of the sphere is oversized in comparison to the bore so that perfect tightness of the closure is guaranteed. If the solid sphere is pressed directly into the bore that is to be closed, a high radial pressure is generated on the circular pressing surface upon pressing in, and this may cause damage to the bore.

OBJECT AND SUMMARY OF THE INVENTION

The object underlying the invention is to avoid this disadvantage and to devise a closure element of the type specified at the start that does not cause any damage to the bore and nevertheless guarantees perfect and permanent tightness of the closure even with larger bore tolerances.

According to the invention this object is achieved in that the closure body of the closure element is made in the form of a hollow body.

The closure element can therefore easily give way when the closure body is pressed into the bore so that it exerts a reduced radial pressure upon the wall of the bore hole, which pressure is on the one hand sufficient for a perfectly tight closure, but at the same time guarantees the integrity of the bore. The reduced radial pressure also enables the use of the closure element in bores with a thinner wall thickness. Moreover, the hollow closure body offers the advantage of a lower weight, it can be produced inexpensively and can easily be fitted in the bore.

Depending on the required pressure output in the interior of the bore that is to be closed, the wall thickness of the hollow closure body can be chosen such that the load applied to the bore is minimal.

According to the invention the cavity of the closure body can be sub-divided by at least one partition wall that is preferably positioned centrally. In this way the hollow body may be provided with the required overall strength independently of its design without this having any negative impact upon the plastic deformability of the hollow body in the region of the sealing surface.

The invention likewise makes provision such that in a first variation the closure body is spherical in form, in particular in the form of a spherical hollow ball with a preferably uniform wall thickness. This is advantageous from the manufacturing standpoint and also when fitting the closure body into the bore because due to the spherical ball shape, no defined fitting position for the hollow sphere is required.

However, depending on the conditions of use, the closure element according to the invention may be shaped with designs that differ from the spherical form. In particular it may be made in the form of a barrel and/or be otherwise adapted to the cross-sectional geometry of the bore that is to be closed.

The properties described above of the closure element according to the invention can be enhanced by the closure body being produced with multiple layers, its outer layer preferably being softer than the inner layer. This also provides it with a wider sealing surface.

In another variation the closure body in the bore is subjected to inductive hardening during the setting process. In this way it can be fixed securely in the insertion position that is adopted, and the pressure output is increased by the increase in strength.

The closure body according to the invention is primarily designed so that it can be pressed directly into the bore that is to be closed. However, it can also be used as an expansion element of a closure with a closure plug recessed into the bore.

BRIEF DESCRIPTION OF THE DRAWINGS

In the following the invention will be described in more detail by means of a number of exemplary embodiments with reference to the drawings. These show as follows.

DETAILED DESCRIPTION OF THE INVENTION

Figure 1:
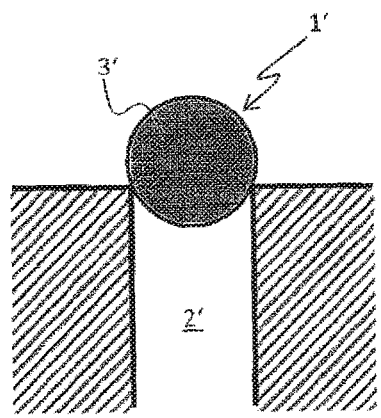
FIG. 1 is a closure element in section, shown before being fitted in the bore that is to be closed.

The closure element 1' shown in FIG. 1 serves to tightly close a bore 2' with a closure body 3' the diameter of which is oversized relative to the diameter of the bore that is to be closed. By pressing the closure body 3' into the bore 2' the latter is securely closed.

Such closure elements 1 are inserted into housings with bores 2 and walls 4 which are, for example, engine housings of motor vehicles, hydraulic units, valve blocks or the like.

Figure 2:
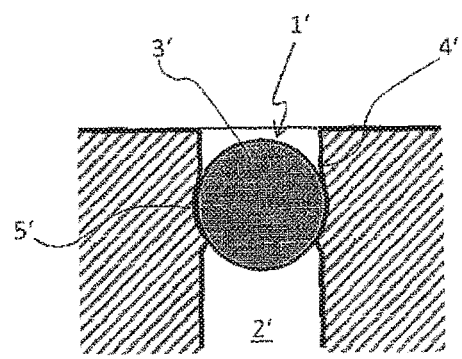
FIG. 2 is the closure element according to the prior art in section, after fitting.

As can be seen from FIG. 2, with a conventional solid sphere 3' deformation of or damage to the bore is caused because due to the oversize a high degree of radial pressure is exerted upon the wall 4', 5' and also in the region of the bore where the sphere is inserted.

The closure element 1 according to the invention includes a closure body 3, which is also oversized, is made in the form of a hollow body so that the closure body 3 can easily deform elastically and/or plastically when the closure body 3 is pressed into the bore 2. It radial pressure against the wall 4 of the bore hole is thus reduced to such an extent that it guarantees perfect and permanent tight closure of the bore without damaging the bore. The plastic deformation of the hollow body also results in an enlarged sealing surface.

Very advantageously, the shaping, the wall thickness and/or the composition of the material of the closure body 3 made in the form of a hollow sphere are chosen such that elastic deformation takes place when it is pressed into the bore 2, and so in the pressed in state a permanent compressive force acting radially outwardly on the bore 2 is produced. The outside diameter of the closure body 3 is oversized in comparison to the inside diameter of the bore 2 such that a defined elastic deformation takes place when it is pressed into the bore.

For example, with a bore diameter of 10 mm the diameter of the sphere can be 10.1 to 10.5 mm depending on how great the elastic deformation of the hollow sphere is designed to be. Preferably, this oversize moves at a ratio of 1% to 5% to the bore diameter. This oversize is distributed to each half on both sides of the sphere, i.e. if the latter is 0.3 mm, a difference of 0.15 mm results on each side between the sphere and the bore.

Due to the reduced radial pressure that is produced it is additionally possible to use the closure element to close bores with a thinner wall thickness. Another advantage also results from the reduced own weight of the hollow closure body, a feature that is advantageous, for example, in automotive or aircraft construction.

This closure body 3 is made in the form of a spherical hollow ball and has a uniform wall thickness. In this way production of the hollow body is simplified. Depending on the design of the bore 2 the hollow sphere can, however, also deviate somewhat from the precisely spherical form, for example when the bore that is to be closed is not to have a precisely circular cross-section.

The closure body 3 is generally produced from a metallic material, in particular steel, by welding together two sphere halves, by casting the hollow sphere, by means of a 3D printer, spinning application or the like.

Figure 3:
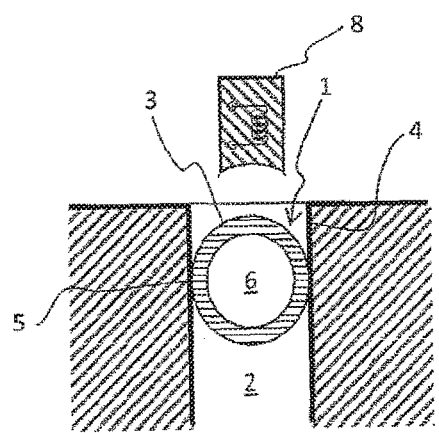
FIG. 3 is the closure element according to FIG. 2 with a device for hardening the closure body during the setting process, illustrated diagrammatically.

As illustrated in FIG. 3, the closure body 3 can be treated in the bore 2 during the setting process by inductive hardening or quenching and tempering by means of an appropriate heating means 8. In this way, in the fitted installation position, it preferably remains precisely thus, fixed tightly to the wall 4, over the entire life span of the housing because another result of the hardening or quenching and tempering is that in the fitted state the stress points are only subjected to a low degree of stress.

Figure 4:
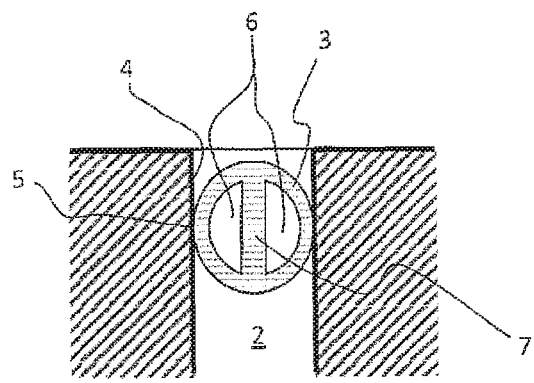
FIG. 4 is a section of a variation of a closure element according to the invention.
Figure 5:
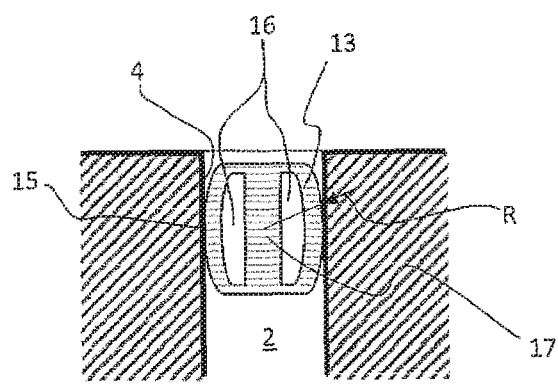
FIG. 5 is a section of another variation of a closure element according to the invention.
Figure 6:
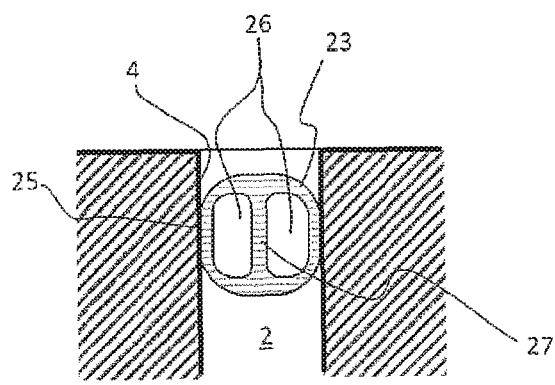
FIG. 6 is a section of another embodiment of a closure element.

Within the context of greater overall strength of the hollow body, its interior 6 can be sub-divided by at least one preferably centrally positioned separating web 7, 17, 27 or the like, as can be seen in FIG. 4 to FIG. 6. Advantageously, this separating web 7, 17, 27 is made in the form of a pin, and the interior 6 that is formed is made in the form of a sleeve. Advantageously, the separating web is arranged concentrically to the bore axis. In this way the rigidity of the hollow body can be increased in the direction of the pressing in pressure without this having any negative impact on the deformability of the hollow body transversely to the sealing surface. However, the separating web 7 is unnecessary if the wall thickness on its own is sufficient for the rigidity of the hollow body.

A corresponding variation of a closure body 13 is shown in FIG. 5 in which provision is made for a barrel-shaped design in which this closure body 13 is flat on its upper and its lower side, and the outer radius R is greater than half the diameter of the bore 2 so that, as shown, after setting an annular sealing surface 15 is produced in order to improve the required sealing of the bore 2. This flat design enables an easier pressing in process.

In a similar exemplary embodiment of a closure body 23 according to FIG. 6, the latter is formed with an outer shape similar to that of FIG. 5, and so reference is made to the above comments with regard to the closure body 13.

The closure body can also be produced in a number of layers, by means of which it is possible to adapt the material of the individual layers to their local stressing. It is particularly advantageous if the material for the outer layer of the hollow body is softer than for the inner layer. In this way the effective sealing surface of the closure element can also be enlarged. Such an inner layer can be provided here over the entire surface of the sphere or only as a ring at the contact point with the bore.

In the exemplary embodiments described above, the hollow closure element is fitted directly in the bore that is to be closed. However, the same advantages result if the hollow closure element is used as an expansion body with closures with a closure plug recessed into the bore, as demonstrated for example in EP PS 0 364 699 B1.

The closure body according to the invention has a gentle effect upon the wall of the bore hole to be closed. The wall thickness of the hollow sphere can be approximately between 1 and 5 mm, depending on the choice of material and requirement criteria.

The closure body according to the invention additionally offers the advantage that it can also be used with relatively large tolerances of the bore diameter because it can compensate for these tolerances, in particular by means of its elastic and consequently plastic deformability. Due to the interaction of its shaping, its wall thickness and the composition of its material it is moreover possible to combine these parameters with one another from case to case so that the closure is always optimally designed for the respective conditions of use.

The interior of the hollow body can be filled with a gaseous or foam material, or also with an activatable liquid.

The invention is sufficiently described by these different variations. Needless to say other designs of closure element according to the invention could however also be described.

The invention claimed is:
1. Closure element for tightly closing a bore, comprising:
   a closure body having a defined outside diameter and which is oversized in comparison to an inside diameter of the bore so that the closure body can be pressed into the bore and so that a defined elastic deformation takes place,
   wherein the closure body is made in the form of a spherical hollow ball,
   wherein the outside diameter of the closure body is selected relative to the bore such that elastic deformation takes place when the closure body is pressed into the bore so that in the pressed-in state of the closure body when the closure body is within the bore, a permanent compressive force acting radially outwards on the bore is produced, and
   wherein the closure body is produced from a metallic material.
2. Closure element for tightly closing a bore, comprising:
   a closure body having a defined outside diameter and which is oversized in comparison to an inside diameter of the bore so that the closure body can be pressed into the bore and so that a defined elastic deformation takes place,
   wherein the closure body is made in the form of a barrel,
   wherein the closure body is flat on its upper and its lower side, wherein an outer radius of the closure body is greater than half the inside diameter of the bore, and wherein the outside diameter of the closure body is selected relative to the bore such that elastic deformation takes place when the closure body is pressed into the bore so that in the pressed-in state when the closure body is within the bore, a permanent compressive force acting radially outwards on the bore is produced.

3. Closure element according to claim 1, wherein a cavity of the closure body is sub-divided by at least one centrally positioned separating web.

4. Closure element according to claim 3, wherein the at least one separating web is arranged like a pin concentrically to a bore axis and the cavity is therefore sleeve-like in form.

5. Closure element according to claim 1, wherein the closure body is produced from steel.

6. Closure element according to claim 1, wherein the closure body is produced by a 3D printer.

7. Method for producing a closure element for tightly closing a bore, wherein the closure element includes a closure body having a defined outside diameter so that the closure body can be pressed into the bore, the closure body being made in the form of a hollow body, the outside diameter of the closure body being selected such that elastic deformation takes place when the closure body is pressed into the bore so that in the pressed-in state, a permanent compressive force acting radially outwards on the bore is produced, the method comprising:

treating the closure body in the bore during a setting process by inductive hardening and/or quenching and tempering.

8. Method according to claim 7, wherein the closure body is filled with a foam.

9. Closure element according to claim 1, wherein the closure body is filled with a foam.

10. Closure element according to claim 2, wherein the closure body is filled with a foam.

11. Closure element according to claim 1, wherein the closure body is produced from steel.

12. Closure element according to claim 1, wherein the closure body consists of the metallic material.

13. Closure element according to claim 2, wherein the closure body consists of a metallic material.

14. Closure element according to claim 2, wherein the closure body is produced from a metallic material.

15. Closure element according to claim 2, wherein the closure body is produced from steel.

16. Closure element according to claim 2, wherein a cavity of the closure body is sub-divided by at least one centrally positioned separating web.

17. Closure element according to claim 16, wherein the at least one separating web is arranged like a pin concentrically to a bore axis.

18. Method according to claim 7, wherein the step of treating the closure body in the bore during the setting process comprises inductive hardening the closure body.

19. Method according to claim 7, wherein the step of treating the closure body in the bore during the setting process comprises quenching and tempering the closure body.

20. Method according to claim 7, wherein the closure body is treated after the closure body is pressed into the bore to a position in which the closure body in its entirety is within the bore.

\* \* \* \* \*